July 28, 1931.  F. C. WALTERS  1,816,270
GO-AROUND SAWMILL
Filed Aug. 8, 1927
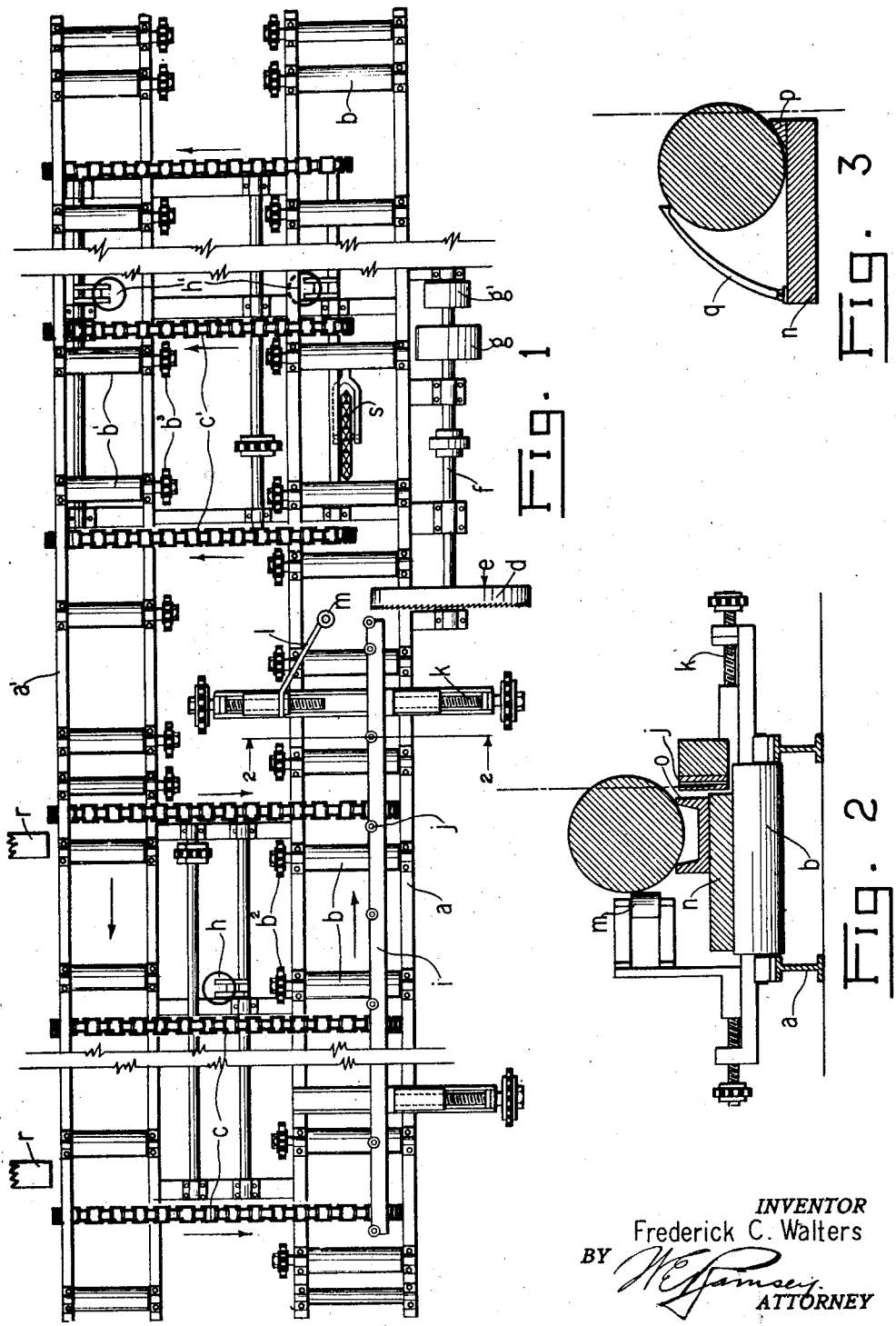
INVENTOR
Frederick C. Walters
BY
ATTORNEY Patented July 28, 1931

1,816,270

UNITED STATES PATENT OFFICE

FREDERICK C. WALTERS, OF EUGENE, OREGON

GO-AROUND SAWMILL

Application filed August 8, 1927. Serial No. 211,557.

My invention relates to a new method and means for sawing round logs into lumber. The generally practiced manner is to fasten the logs to a reciprocating carriage and to move such carriage with the log locked thereon past a saw, feeding the carriage toward the saw to make the various thickness of cuts. The log is locked to the carriage and its various faces are presented to the saw in making the several cuts. On large logs this method is extremely practical but on smaller logs the necessary equipment required makes this operation impractical to such an extent, except on hard and on other valuable woods, that such small logs are practically valueless from the standpoint of lumber production. Conservation of such smaller logs is a national problem, especially in the soft wood belts.

Some manufacturers have attacked and partially solved the problem by slabbing such smaller logs on a carriage, that is cut two adjacent faces of the log so as to form right angles and then using such flat faces as guides for passing them thru a re-saw mill. Other manufacturers have partially solved the problem by sawing the logs in halves and arranging such halves on their flat sides and running them thru a horizontal re-saw mill. Both of such plans, however, require two or more machines to complete the operation of making lumber from round logs and such plurality of machines not only require increased floor space, multiplied investment and double handling, but also unnecessary waste valuable timber.

The object of my invention is to provide a method, and a single machine adapted to embody such method, by which small round logs may be cut up into lumber efficiently and the lumber cut therefrom to be sections and grades of greatest commercial value.

Heretofore several operators have adopted a so-called "go-around", which consists of two lines of live rollers, the lines being spaced apart and substantialy parallel to each other. A sawing element, preferably a band saw, is aligned with one of such lines of rollers and transfer mechanism is arranged at each side of the saw adapted to return the uncut portion of a log to the saw and guiding elements are provided for positioning the timber relatively to the saw.

I attain my object by modifying a standard "go-around" by providing a separable flat carriage adapted to ride such live rollers, such carriage having means such as a cradle or a set of dogs carried thereby to hold round logs firmly thereon. One or both edges of each carriage is plane to constitute a guiding edge to be engaged by the positioning mechanism and the first slabbing cuts are made while the log is carried by such carriage. The log is then removed from the carriage and the remaining cuts are made while the log rests on one of its flat sides directly upon the live rollers, the guiding mechanism being adjusted to make the desired cuts.

Further details of my invention are hereinafter described with reference to the accompanying drawings, in which:

Fig. 1 is a plan view of a portion of a machine embodying my invention;

Fig. 2 is a transverse view thru such machine taken on the line 2—2 in Fig. 1, showing a log mounted upon one type of carriage in place in such machine; and Fig. 3 is a view similar to Fig. 2, except on a smaller scale and showing a modified type of log-supporting means for such carriage.

A "go-around" which particularly lends itself to my invention comprises a frame $a$ in which a plurality of aligned feed rollers $b$ are carried. A similar frame $a'$ carries a line of feed rollers $b'$. The direction of rotation of rollers $b$ tends to move a log carried thereon from left to right, as shown in Fig. 1, and the feed rollers $b'$ tend to move the log in the opposite direction, that is, from right to left. Transfer mechanism, preferably chains $c$ and $c'$ tend to move the log from the rollers $b'$ to the rollers $b$, and from the rollers $b$ to the rollers $b'$, respectively. Between such transfer mechanisms the saw element, preferably a band saw $d$, is arranged in substantial alinement with the feed rollers $b$ and thus such log conveying devices tend to move logs to be sawed to the saw element, around behind it and again return the same so that successive cuts thereon can be made by the saw.

The band saw $d$ is carried over a pulley $e$ mounted upon the shaft $f$, and the latter is driven by either of the pulleys $g$ or $g'$. To simplify the drawings the driving mechanism for the rollers and transfer chains is not shown except that each roller $b$ is shown as carrying a sprocket $b^2$ and each roller $b'$, a sprocket $b^3$. Air lifts $h$ and $h'$ are shown diagrammatically for the usual purpose of shifting the logs on to and off of the transfer mechanism.

Lying along side of the feed rollers $b$ and mounted upon the frame $a$ is a vertical head block $i$ having vertically arranged roller elements $j$ on its face. Screw elements $k$ threaded into the frame $a$ adjust such head block relatively to the saw line. A guiding arm $l$ having a guide roller $m$ at its outer end is arranged to engage the side of the log away from the head block, such guide roller being arranged close to the saw $d$ to hold the log firmly against the head block, thus to insure straight lumber.

To such "go-around" I add log carriages $n$ comprising elongated flat elements, preferably planks, for example planks 20 feet long and 4 x 12 inches in cross-section, and on such planks I provide a cradle of sufficient width to hold the log securely on the carriage. Such cradle may be made of a channel section $o$, which is capable of withstanding wear and hard usage. The smaller logs are carried by carriages of this character, shown diagrammatically in Fig. 2. Larger logs are carried by carriages as $n'$, which are made of planks, for example planks 20' long and 4 x 30 inches in cross-section, having a chock $p$ at one edge and a set of hinged dogs $q$ mounted at the opposite edge and adapted to engage and hold a log in abutment with such chock $p$, as shown in Fig. 3.

A supply of such carriages is arranged at or near the log deck $r$ and the round logs to be operated upon are mounted on one or the other of such carriages and moved by the transfer mechanism $c$ on to the live rollers $b$. The head blocks $i$ and rollers $j$ are only of such height as to engage the edge of the carriage $n$ or $n'$ and one of both edges of such carriages are plane to constitute a straight guiding edge for the log. The desired thickness of slab is cut from one edge of the log while the latter is locked to the carriage and then such log is removed from the carriage and placed on its flat side. The carriage and the log are returned by the transfer mechanism $c'$ and the live rollers $b'$ to a position in front of the log deck $r$ where the carriage is removed from the conveying mechanism and placed in storage for future use.

To provide continuous operation for the saw a number of logs are spaced along the conveying mechanism so as to eleminate the necessity for waiting until each log has been returned from the discharge to the intake side of the saw element.

At the discharge side of the saw $d$ and adjacent the saw line is a toothed wheel $s$ for engaging the under side of the log being sawed to hold such log in alinement with such saw line. Such toothed wheel is preferably yieldingly mounted to permit it to ride over the irregularities on the surface of the log.

I claim:

The combination in a saw mill of the character described, including a saw, a conveyor adapted to move material to be sawed along a path extending past such saw, a removable log-carrying element provided with bodily immovable log rotation preventing devices and having one plane edge surface, adapted to ride such conveyor, guiding elements arranged alongside such conveyor adjacent such saw and extending vertically upwardly from the plane of the path of said conveyor and positioned interchangeable to engage the plane edge surface of such log-carrying element as it is moved along by such conveyor and to engage and restrain a log mounted directly on the conveyor, and setting means for such guiding elements, adjustable transversely of such path to determine the thickness of the slab to be cut by the saw.

FREDERICK C. WALTERS.